United States Patent
Hosokawa et al.

(10) Patent No.: US 6,274,663 B1
(45) Date of Patent: Aug. 14, 2001

(54) COMPOUND RESIN COMPOSITION

(75) Inventors: Teruo Hosokawa; Hirofumi Inoue, both of Kawasaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/331,638

(22) PCT Filed: Oct. 30, 1997

(86) PCT No.: PCT/JP97/03944

§ 371 Date: Jun. 23, 1999

§ 102(e) Date: Jun. 23, 1999

(87) PCT Pub. No.: WO99/23167

PCT Pub. Date: May 14, 1999

(51) Int. Cl.$^7$ ..................................... C08K 3/00
(52) U.S. Cl. ................. 524/442; 524/444; 524/445; 524/449
(58) Field of Search .................. 524/442, 444, 524/445, 449

(56) References Cited

U.S. PATENT DOCUMENTS

| | | | |
|---|---|---|---|
| 4,894,411 | 1/1990 | Okada et al. | 524/710 |
| 5,102,948 | 4/1992 | Deguchi et al. | 524/789 |

FOREIGN PATENT DOCUMENTS

| | | | |
|---|---|---|---|
| 3808623C2 | 3/1988 | (DE) | C08L/77/00 |
| 0398551 | 5/1990 | (EP) | C08K/3/34 |
| 51-103900 * | 9/1976 | (JP) . | |
| 63-230766 | 9/1988 | (JP) | C08L/77/00 |
| 2-305828 | 12/1990 | (JP) | C08J/5/18 |
| 4-305005 * | 10/1992 | (JP) . | |
| 7-70357 | 3/1995 | (JP) | C08K/3/34 |
| 7-196313 * | 8/1995 | (JP) . | |

* cited by examiner

*Primary Examiner*—Edward J. Cain
(74) *Attorney, Agent, or Firm*—Sughrue, Mion, Zinn Macpeak & Seas, PLLC

(57) ABSTRACT

A compound resin composition in which an intercalated compound, in which an onium salt of an aminoalcohol derivative is inserted into the layers of a swellable stratified compound and the interlayer distance is 10~25 Å as measured by x-ray diffraction, is finely dispersed in a heat curable resin, wherein the proportion is the intercalated compound with respect to the compound resin composition is in the range of 0.5~60% by weight. This compound resin composition has excellent bending elastic modulus and thermal resistance, and is therefore suitably employed in a number of fields such as the automotive components, home appliance parts, aircraft parts, and construction materials fields, among others.

7 Claims, No Drawings

COMPOUND RESIN COMPOSITION

TECHNICAL FIELD

The present invention relates to a compound resin composition having excellent resistance to impact and heat, as well as superior capacity as a gas barrier, this compound resin composition being suitably employed in a broad range of fields, such as the automotive components field, home appliance parts materials field, aircraft parts field, construction materials field and the like.

BACKGROUND ART

Compound resin compositions having high degree of mechanical strength have been required in a variety of fields. Resin rigidity, thermal resistance and impact resistance have been improved by dispersing a filler in the resin. In particular, many attempts have been made to improve mechanical properties and thermal resistance by dispersing a filler in molecular form in a polymeric material.

For example, Japanese Patent Application, First Publication No. Hei 2-10226 discloses a technique in which an intercalated compound is formed by inserting an organic cation between the layers of a stratified clay mineral, opening the distance between the layers. At this point, monomer is inserted and then polymerized. Using the polymerization energy at this time, the intercalated compound is dispersed in molecular form.

In this method, the organic cation in the polycondensation reaction of polyamide, polyester or the like, may be substituted by a monomer hydrochloride, or intramolecular cyclic salts, carboxylic monoester or the like.

A second method is known in which an attempt is made to disperse a stratified clay mineral in molecular form by using an organic cation to swell the stratified clay mineral in advance, and then subjecting the clay mineral to infinite swelling using an organic solvent, so that the stratified clay mineral takes on a house-of-cards structure. The stratified clay mineral is then dispersed in molecular form by bringing it into contact with a melted polymer.

However, the former of these two methods, while dispersing the filler with good efficiency, requires equipment for polymerization. Accordingly, production costs rise, so that this method cannot be viewed as economical. This reaction is currently employed in polyamide and polyester which are condensation polymerization systems. In addition, in heat-cured resins, the reaction is limited to radical polymerization or cation polymerization of the type in which a reactive monomer is inserted into the layers and then polymerized. Since the monomer inserted between the layers must be one which exists stably therein, the monomer employed is limited to liquid monomers. Accordingly, this first method has a drawback in that it provides only limited resin materials having a low filler density when obtaining a compound resin composition in which a filler is dispersed in molecular form. As a method to improve these circumstances, as disclosed in Japanese Patent Application, First Publication No. Sho 63-230766, Japanese Patent Application, Second Publication No. Hei 7-47644, Japanese Patent Application, First Publication No. 7-70357 and the like for example, the aforementioned second method proposes bringing the clay mineral into contact with a solvent. The infinitely swelled clay mineral is then directly dispersed in the polymer by bringing it into contact with a hydrophobic resin. However, a large amount of organic solvent must be used in methods of this type. In addition, even if the employed organic solvent contributes to infinite swelling, solubility between the polymer and organic solvent may be poor depending upon the polymer employed. In this case, it may not be possible to disperse the infinitely swelled stratified mineral in the polymer due to the infinitely swelled stratified mineral's affinity to the organic solvent. This type of polymer has very poor affinity with the solvent, even if the resin is melted. As a result, the infinitely swelled layered mineral formulated in advance by treatment with an organic cation has poor affinity and is difficult to disperse, even if brought into contact with a melted liquid polymer, so that complete dispersion is never reached. Moreover, even when an intercalated compound obtained by bringing a stratified mineral into contact with an organic cation has been infinitely swelled using an organic solvent, a portion of the organic solvent is volatilized by the heat in the extruder during the contact with the melted resin, so that the intercalated compound is dispersed in the polymer as it is reverting from an infinitely swelled state to a swelled state. For this reason, in actuality, contact with the melted polymer results as the interlayer distance is shrinking, so that complete dispersion cannot be obtained. In the case of a combination having a large affinity for the organic solvent that employs a non-crystalline resin having good affinity with the organic solvent, dispersion is possible even in the former production method, although it is not complete. However, it is extremely difficult to obtain a good dispersion for crystalline materials. In order to resolve this problem, manipulation of the extruder has also been employed. Namely, as may be seen in Japanese Patent Application, First Publication No. Hei 7-70357, a method has been disclosed in which, when the extruder screw length (L) is expressed as the ratio of screw length/screw diameter (D), i.e. =L/D, the contact time is lengthened by employing an extruder screw length (L) of 45 or more, and the stratified compound infinitely swelled using the organic solvent is dispersed by injection from the lateral surface of the sleeve using a pump. In addition, a mixing and kneading device, such as a banbury mixer, can also be employed as a batch method. However, there is a notable reduction in the treated quantity due to the difficulty in removing the solvent, so that this approach is not economical. The present invention was conceived in order to remedy the costliness associated with using specialized extruders or organic solvents because of the restrictions arising from the aforementioned polymerization reaction. Namely, the present invention provides a compound resin composition in which an intercalated compound is finely dispersed on the nanolevel directly into a resin, this compound resin composition having superior rigidity, and excellent resistance to heat and impact.

DISCLOSURE OF INVENTION

The present invention is a compound resin composition in which an intercalated compound, in which an onium salt of an aminoalcohol derivative is inserted into the layers of a swellable stratified compound and the interlayer distance is 10∞25 A as measured by x-ray diffraction, is finely dispersed in a thermoplastic resin, the present invention offering a compound resin composition in which the proportion of the intercalated compound with respect to the compound resin composition is in the range of 0.5~60% by weight.

BEST MODE FOR CARRYING OUT THE INVENTION

The present invention's compound resin composition is primarily characterized in that an aminoalcohol derivative having onium group is employed as the organic cation for widening the interlayer distance in the intercalated compound.

The swellable stratified compounds used in the present invention indicate stratified compounds which demonstrate swellability by organic cations, with clay minerals being primary among these. Examples thereof include swellable clay minerals, zirconium phosphate, chalcogens glass, and the like. Stratified clay minerals are particularly suitable, with compounds satisfying the following rational formula being preferred.

To give one example, these compounds may be expressed by the following rational formula.

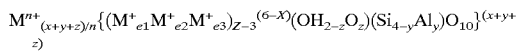

$$M^{n+}{}_{(x+y+z)/n}\{(M^+{}_{e1}M^+{}_{e2}M^+{}_{e3})_{z-3}{}^{(6-X)}(OH_{2-z}O_z)(Si_{4-y}Al_y)O_{10}\}^{(x+y+z)}$$

(x+y+z): silica compound charge amount

M is an interlayer exchangeable metal ion, and is at least one cation selected from the group comprising alkali metal ions and alkaline earth metal ions. Examples which may be cited thereof include Li, Na, K, Be, Mg, Ca and the like. $M^+{}_{e1}M^+{}_{e2}M^+{}_{e3}$ consists of $M^+e1$ alone, or a plurality of combinations of $M^+{}_{e1}$ and $M^+{}_{e2}M^+{}_{e3}$, and is a cation which will fit into an octahedron formed within a smectite or mica structure. $M^+{}_{e1}$ is selected from among Mg, Fe, Mn, Ni, and Zn, while $M+{}_{e2}$ and $M^+{}_{e3}$ are selected from among Al, Fe, Mn and Cr.

G. Lagaly, A. Weiss "Determinatin of Charge in Mica-type" International Clay Conference, p. 61–80, 1969, discloses that the measure of ease of swellability by organic cations is expressed by the charge density per unit lattice within the layer surface.

If Ae is the layer charge density, then Ae can be calculated using the following formula, wherein the lattice constants $a_o$, $b_o$, and $c_o$ are set from the results of structural analysis using the Liebert method which employs powder x-ray diffraction, and the charge (x+y+z) is determined from the rational formula for a clay mineral following below which is determined from elemental analysis.

$$Ae = a_o \times b_o/2(x+y+z)$$

From among these, stratified minerals such as vermiculite, expandable mica, smectite and the like may be cited as examples of stratified compounds having a high layer charge density.

Vermiculite can be expressed as:

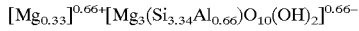

$$[Mg_{0.33}]^{0.66+}[Mg_3(Si_{3.34}Al_{0.66})O_{10}(OH)_2]^{0.66-}$$

Tetrasilicic mica manufactured by Topy Industries Ltd. may be cited as an example of a fluorine-type swelled mica. The rational formula therefor is:

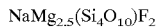

$$NaMg_{2.5}(Si_4O_{10})F_2$$

The compound expressed by the rational formula

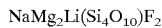

$$NaMg_2Li(Si_4O_{10})F_2$$

may be cited as an example of sodium taeniolite.

Aforementioned stratified compounds having an interlayer charge density that is within the range of 40~100 Å²/(charge) are preferably employed. However, since the ease of widening the interlayer distance when intercalating the organic cation is greatly related to the interlayer charge density, a more preferable range is 40~80 Å²/(charge), with a range of 40–60 Å²/(charge) being particularly preferred. In the case of silica compounds, when the interlayer charge density drops below 40 Å²/(charge), silicate compounds such as above are not present. In a range of 404–60 Å²/(charge), expandable mica demonstrates high swellability. In the range of 60–80 Å²/(charge), the stratified compound is present as vermiculite. Note that while compounds exceeding 100 Å²/(charge) fall outside the claimed scope, the stratified compound exists as smectite within the range of 80~150 Å²/(charge). From this range through 200 Å²/(charge), the stratified compound exists as smectite, however, swellability is poor due to the low quantity of organic cations.

The ion exchange capacity of the stratified compound is measured by a means such as the column osmosis method (reference: "Clay Handbook", Ed. 2, The Clay Science Society of Japan, pages 576–577, Gihodo Shuppan K.K.) (CEC method), or a methylene blue adsorption method Japan Bentonite Industry Association Standard Test Methods, JBAS-107-91), or the like.

The amount of organic cation substitution in the intercalated compound is calculated by thermobalance from the reduction in weight. In the present invention, the amount of organic cation substitution in the intercalated compound is preferably 25~90 meq per 100 g.

It is preferable that the distance between the bottom surfaces, i.e., interlayer distance d (001), in the stratified compound employed in the present invention prior to contact with the organic cation be in the range of 7~13 Å as measured by x-ray diffraction. Preferred examples thereof include compounds having a smectite structure such as vermiculite, saponite, or iron saponite, as well as expandable micas like fluorine tetrasilicic mica, and the like.

When employing an organic cation in a stratified compound having an Ae in the aforementioned range, if the amount of organic cation substitution is less than the equivalent of the ion exchange capacity, then the distance between the bottoms of layers will be small. In addition, as disclosed in the reference by G. Lagaly et al, it is known that the greater the charge (x+y+z) is between the layers, the more the interlayer distance will open, even if there are few organic cations.

When the amount of organic cations is small, the molecular configuration of the cations within the layers becomes such that a single molecule is configured parallel to the layer. If the quantity of organic cations is increased, then the molecules are configured at a given angle within the layers as the amount of organic cations increases. When the amount of organic cations added is increased, so that the molecules are configured at a given angle, it is known that the molecules become configured between the layers in a monolayer or bilayer state, causing the interlayer distance to widen.

Moreover, it has also been disclosed in this case that a longer molecular chain length in this case greatly widens the interlayer distance. However, when an aliphatic alkyl ammonium salt is employed as the organic cation, a compound having a long C chain and high molecular weight is required. As a result, a problem arises in that there is a marked deterioration in thermal resistance.

In addition, with regard to the quantities added, it is known that even in the case of a stratified compound like mica, in which the interlayer charge is large, an organic cation, such as a straight chain aliphatic alkyl ammonium salt, in excess of a specific quantity is necessary to widen the interlayer distance. Namely, a step in which the amount of organic cation added is increased to significantly open the interlayer distance is essential. However, when the amount of organic cation is increased, a large amount of the added organic cation remains in the polymer. This leads to a drop in the temperature at which thermal deformation occurs, so that satisfactory properties cannot be expressed.

In conventional methods, it was recommended that an aliphatic alkyl ammonium salt, such as tetralkyl ammonium salt, in which at least one of the alkyl groups had a carbon number of 16 or greater but less than 25, be employed as the organic cation used to widen the interlayer distance when dispersing a stratified compound in a polymer.

In place of this approach, the present invention improves the properties of a compound resin composition by selecting an organic cation which has a low molecular weight and can, when added in small quantities, effectively disperse in the polymer in molecular form, even when the interlayer distance is small. As a result of a search for and investigation of organic cations capable of dispersing in molecular form in a compound resin composition, even when the organic cation has a short branched chain length and is added in a small quantity, the present inventors discovered that a compound resin composition demonstrating superior thermal resistance, impact resistance and rigidity as compared to conventional tetralkyl ammonium salts could be obtained by employing an onium salt of an aminoalcohol derivative.

The onium salt of an aminoalcohol derivative that is employed in the present invention is not particularly limited, but rather, the various types of onium salts (hereinafter, noted simply as "alcohol derived onium salt") may be employed. Specific examples of the present invention's alcohol derived onium salts include monovalent alcohol derived onium salts such as n-butyl dimethyl monoethanol ammonium, n-hexyl dimethyl monoethanol ammonium, n-octyl dimethyl monoethanol ammonium, n-decyl dimethyl moncethanol ammonium, n-dodecyl dimethyl monoethanol ammonium, n-tridecyl dimethyl monoethanol ammonium, n-hexadecyl dimethyl monoethanol ammonium, n-octadecyl dimethyl monoethanol ammonium, eicosyl dimethyl monoethanol ammonium and the like. The alkyls of the aforementioned compounds may be iso or branching on side chains.

Examples of bivalent alcohol derived onium salts include n-butyl monomethyl diethanol ammonium, n-hexyl monomethyl diethanol ammonium, n-octyl monomethyl diethanol ammonium, n-decyl monomethyl diethanol ammonium, n-dodecyl monomethyl diethanol ammonium, n-tetra decyl monomethyl diethanol ammonium, n-hexadecyl monomethyl diethanol ammonium, n-octadecyl monomethyl diethanol ammonium, eicosyl monomethyl diethanol ammonium or the like. The alkyl groups of the aforementioned compounds may be iso or branching on side chains.

Examples of trivalent alcohol derived onium salts include n-butyl triethanol ammonium, n-hexyl triethanol amino ammonium, n-octyl triethanol ammonium, n-decyl triethanol ammonium, n-dodecyl triethanol amine ammonium, n-butyl decyl triethanol ammonium, n-hexadecyl triethanol ammonium, n-octadecyl triethanol ammonium, eicosyl triethanol ammonium, or the like. The alkyl groups in the aforementioned compounds may be iso, or branching on side chains.

In addition to the above, it is also acceptable that the carbon number of the alkyl group having the hydroxyl group be 3 or higher. However, from the perspective of thermal resistance, a carbon number of less than 16 is desirable.

Examples of alcohol derived onium salts in which an ether bond is contained in the molecular chain include, for example, n-butyl monomethyl ethylene ether ethanol ammonium, n-hexyl dimethyl butyl diethylene ethanol monoethanol ammonium, n-octyl dimethyl monoethanol ammonium, n-decyl dimethyl monoethanol ammonium, n-dodecyl dimethyl monoethanol ammonium, n-tetradecyl dimethyl monoethanol ammonium, n-hexadecyl dimethyl monoethanol ammonium, n-octadecyl dimethyl monoethanol ammonium, eicosyl dimethyl monoethanol ammonium, and the like. The carbon number of the portion of the chain length having the hydroxyl group is in the range of 3~20, with a C number of up to 12 being desirable for effective use and a low molecular weight. Alkyls of the aforementioned compounds may be iso, or may be branching on side chains.

The standard when employing the aforementioned alcohol derived onium salts is optimally selected taking into consideration the fact that the distance between layers becomes greater and fine dispersion becomes easier as the alcohol number and carbon number becomes larger, however, the thermal resistance of the ammonium salt deteriorates.

In the present invention, the interlayer distance as measured by x-ray diffraction of intercalated compounds in which organic cation substitution has been performed using the onium salt of an aminoalcohol derivative is in the range of 10~25 Å, and preferably in the range of 15~25 Å. When the interlayer distance is less than 10 Å, dispersion in not sufficient, so that the improvement effect deteriorates. In contrast, an interlayer distance in excess of 25 Å is not desirable because deterioration in thermal resistance due to the organic cation becomes a problem.

As shown by the present invention, it was discovered that, when a functional group serving as an electron donor, such as a hydroxyl group, is present in the organic cation, the interlayer charge balance is destroyed due to adsorption by the hydroxyl group. The degree of polarization on the side opposite where the positive charge of the organic cation conforms is greater than in the case where tetralkyl ammonium salt is employed, and the bonding strength from adsorption of the polymer is formed to be large. Therefore, a dispersion effect which is larger than when the aforementioned ammonium salts are employed can be generated, even when the polarity at the polar groups is small. In addition, a large dispersion effect can be obtained even at a low molecular weight. As a result of this discovery, it was possible to resolve the problem previously encountered in which the melting or softening temperature of the compound fell due to the use of an organic cation having an extremely long chain length.

The thermoplastic resin employed in the present invention is not particularly limited, provided that it has polar groups. Examples thereof include polyamide, aromatic polyesters and their copolymers, aliphatic polyesters and their copolymers, AS resins, ABS resins, polyphenylene ether, polyphenylene sulfide, polyacetal, polycarbonate and the like.

The present invention's compound resin composition can be obtained through the step of contacting a swellable stratified compound having a high interlayer charge density of 40~100 Å$^2$/(charge) with the onium salt of an aminoalcohol derivative, and the step of contacting the obtained intercalated compound with a thermoplastic resin. It is desirable that the contact be conducted under shear conditions. In this case, in the step for contacting the intercalated compound and the thermoplastic resin, the intercalated compound may be finely dispersed in the thermoplastic resin by means of the usual melting and mixing, without employing an organic solvent or the like.

The compositional ratio of the intercalated compound in the present invention's compound resin composition is in the range of 0.5~60% by weight, with 1~41% by weight being preferred, and 1~20% by weight being even more suitable. When the compositional ratio of the intercalated compound is less than 0.5% by weight, an improvement in the thermal resistance and mechanical properties cannot be realized. On the other hand, when the compositional ratio of the intercalated compound exceeds 60% by weight, dispersion of the intercalated compound in the polymer is not sufficient, so that the efficacy of the present invention is not displayed.

The present invention will now be explained in greater detail employing examples.

EXAMPLE 1

50 g of n-lauryl monomethyl diethanol ammonium chloride was dissolved in 1000 ml of water, and then added to tetrasilicic mica manufactured by Topy Industries Ltd. (the ion exchange capacity (CEC method) was 150 meq/100 g), to be contacted therewith in suspension form. Next, the mixture was filtered, washed and then dried. The amount of organic ion substituted in the tetrasilicic mica was 40 meq/100 g when measured by thermobalance. The interlayer distance (distance between bottom surfaces of layers) d (001)was measured using x-ray diffraction (Table 1).

The obtained intercalated compound was dry blended with 95% by weight polyamide 6 (molecular weight: 50,000) so that the tetrasilicic mica content was 5% by weight. Contact and mixing was then performed using a biaxial extruder having a screw diameter of 30 millimeters, and a size of (screw length)/(screw diameter)=30. The resin temperature at this time was 250° C.

Measurement of the mechanical properties of the obtained compound resin composition using an ISO 178 measurement method revealed a bending elastic modulus of 47,000 kg/cm$^2$, two-fold greater than the polyamide 6 starting material, which had a bending elastic modulus of 25,000 kg/cm$^2$ In addition, the thermal resistance as measured by an ISO 75 measurement method was 125° C. under a load of 18.5 kg/cm$^2$, higher than that of the polyamide 6 starting material, which had a thermal resistance of 64° C. In order to examine dispersion, the obtained compound resin composition was injection molded, and cross sections were finely cut using a microtome in a direction perpendicular to the direction in which the molded filler was disposed. The cross section of the disposed filler was viewed by observing 500 or more grains under a transmission electron microscope. If the longitudinal direction and the cross direction of the filler are designated as the long diameter and short diameter, respectively, then the short diameter expresses the thickness of the clay mineral laminate. Accordingly, the arithmetic average thereof was designated as the average thickness. These results are summarized in Table 3.

EXAMPLE 2

Formulation and evaluation were carried out in the same manner as in Example 1, with the exception that the amount of organic cation substitution in the intercalated compound in Table 1 was 18 meq/100 g. The obtained results are shown in Table 3.

EXAMPLE 3

Formulation and evaluation were carried out in the same manner as in Example 1, with the exception that a compound was formulated in which the amount of organic ion substituted was 80 meq/100 g, as shown in Table 1. These results are shown in Table 3.

EXAMPLE 4

Formulation and evaluation were carried out in the same manner as in Example 1, with the exception that n-lauryl triethanol ammonium chloride was employed as the organic cation, as shown in Table 1. These results are shown in Table 3.

EXAMPLE 5

Formulation and evaluation were carried out in the same manner as in Example 1, with the exception that n-decyl monomethyl diethanol ammonium chloride was employed as the organic cation, as shown in Table 1. These results are shown in Table 3.

EXAMPLE 6

Formulation and evaluation were carried out in the same manner as in Example 1, with the exception that n-octyl monomethyl diethanol ammonium chloride was employed as the organic cation, as shown in Table 1. These results are shown in Table 3.

EXAMPLE 7

Formulation and evaluation were carried out in the same manner as in Example 1, with the exception that n-hexyl monomethyl diethanol ammonium chloride was employed as the organic cation, as shown in Table 1. These results are shown in Table 3.

EXAMPLE 8

Formulation and evaluation were carried out in the same manner as in Example 1, with the exception that n-butyl monomethyl diethanol ammonium chloride was employed as the organic cation, and polyamide 66 was employed as the resin, as shown in Table 1. These results are shown in Table 3.

EXAMPLE 9

Formulation and evaluation were carried out in the same manner as in Example 1, with the exception that n-lauryl monomethyl diethanol ammonium was employed as the organic cation, and mixing and kneading with the resin was performed so that the proportion of the stratified compound was 60% by weight, as shown in Table 1. These results are shown in Table 3.

EXAMPLE 10

Formulation and evaluation were carried out in the same manner as in Example 9, with the exception that mixing and kneading with the resin was performed so that the proportion of the stratified compound was 0.5% by weight, as shown in Table 1. These results are shown in Table 3.

EXAMPLE 11

Formulation and evaluation were carried out in the same manner as in Example 3, with the exception that vermiculite was employed as the stratified compound, as shown in Table 2. These results are shown in Table 4.

EXAMPLES 12~17

Formulation and evaluation were carried out in the same manner as in Example 3, with the exception that polyacetal (Example 12), AS resin (Example 13), polyphenylene sulfide (PPS, Example 14), polyphenylene ether (PPO, Example 15), polybutylene terephthalate (PBT, Example 16), and polycarbonate (PC, Example 17) were employed respectively as the thermoplastic resin, as shown in Table 2. These results are shown in Table 4.

Comparative Example 1

Formulation and evaluation were carried out in the same manner as Example 1, with the exception that ion exchange was carried out using n-lauryl triethyl ammonium chloride as the organic cation, and the amount of organic cation substituted was 80 meq/100 g, as shown in Table 2. As a result, dispersion was notably poor (Table 4).

Comparative Example 2

Formulation and evaluation were carried out in the same manner as Example 1, with the exception that a compound material was formulated in which n-lauryl triethyl ammonium chloride, which is a tetralkyl ammonium salt, was employed as the organic cation, and the amount of organic cation substituted was 40 meq/100 g, as shown in Table 2. These results are shown in Table 4.

Comparative Example 3

Formulation and evaluation were carried out in the same manner as Example 9, with the exception that dihexyldecyl trimethyl ammonium chloride was employed as the organic cation, and polyamide 66 was employed as the polymer (Table 4), as shown in Table 2. The interlayer distance in the ion-substituted intercalated compound was 36.5 Å, indicating a widening of the interlayer distance as compared to Example 9 in which the interlayer distance was 20 Å. Namely, electrical attraction in each of the layers had become smaller. Nevertheless, there was a deterioration in the improvement effect on the bending elastic modulus and thermal resistance as compared to Example 9. Moreover, the thickness of the silicate layer was 100 Å, and dispersion was poor.

Comparative Example 4

Formulation and evaluation were carried out in the same manner as Example 3, with the exception that dihexyldecyl dimethyl ammonium chloride was employed, and mixing and kneading with a resin was performed so that the proportion of the stratified compound became 0.5% by weight. These results are shown in Table 4.

TABLE 1

| | properties of stratified compound | | organic cation | | interlayer distance in intercalated compound (Å) | polymer employed | compositional ratio wt % | | |
|---|---|---|---|---|---|---|---|---|---|
| | stratified compound | layer charge density | type of organic cation | amount of ion substitution meq/100 g | | | stratified compound | organic cation | polymer |
| Ex. 1 | tetrasilicic mica | 49 | n-lauryl monomethyl diethanol ammonium | 40 | 20 | polyamide 6 (PA6) | 5.00 | 0.57 | 94.43 |
| Ex. 2 | tetrasilicic mica | 49 | n-lauryl monomethyl diethanol ammonium | 18 | 16 | PA6 | 5.00 | 0.26 | 94.74 |
| Ex. 3 | tetrasilicic mica | 49 | n-lauryl monomethyl diethanol ammonium | 80 | 23 | PA6 | 5.00 | 1.14 | 93.86 |
| Ex. 4 | tetrasilicic mica | 49 | n-lauryl triethanol ammonium | 40 | 21.5 | PA6 | 5.00 | 0.64 | 94.36 |
| Ex. 5 | tetrasilicic mica | 49 | n-decyl monomethyl diethanol ammonium | 40 | 19 | PA6 | 5.00 | 0.52 | 94.48 |
| Ex. 6 | tetrasilicic mica | 49 | n-octyl monomethyl diethanol ammonium | 40 | 17 | PA6 | 5.00 | 0.46 | 94.54 |
| Ex. 7 | tetrasilicic mica | 49 | n-hexyl monomethyl diethanol ammonium | 40 | 17 | PA6 | 5.00 | 0.41 | 94.59 |
| Ex. 8 | tetrasilicic mica | 49 | n-butyl monomethyl diethanol ammonium | 40 | 16 | PA66 | 5.00 | 0.35 | 94.65 |
| Ex. 9 | tetrasilicic mica | 49 | n-lauryl monomethyl diethanol ammonium | 40 | 20 | PA6 | 60.00 | 6.82 | 33.51 |
| Ex. 10 | tetrasilicic mica | 49 | n-lauryl monomethyl diethanol ammonium | 40 | 20 | PA6 | 0.50 | 0.06 | 99.54 | ion substitution quantity is (exchanged ion equivalents)/100 g stratified compound

TABLE 2

| | properties of stratified compound | | organic cation | | interlayer distance in intercalated compound (Å) | polymer employed | compositional ratio wt % | | |
|---|---|---|---|---|---|---|---|---|---|
| | stratified compound | layer charge density | type of organic cation | amount of ion substitution meq/100 g | | | stratified compound | organic cation | polymer |
| Ex. 11 | vermiculite | 95 | n-lauryl monomethyl diethanol ammonium | 80 | 23 | PA6 | 5.00 | 1.14 | 93.86 |
| Ex. 12 | tetrasilicic mica | 49 | n-lauryl monomethyl diethanol ammonium | 80 | 23 | polyacetal | 5.00 | 1.14 | 93.86 |
| Ex. 13 | tetrasilicic mica | 49 | n-lauryl monomethyl diethanol ammonium | 80 | 23 | AS | 5.00 | 1.14 | 93.86 |

TABLE 2-continued

| | properties of stratified compound | | organic cation | | interlayer distance | | compositional ratio wt % | | |
|---|---|---|---|---|---|---|---|---|---|
| | layer | | | amount of ion | in intercalated | | | | |
| | stratified compound | charge density | type of organic cation | substitution meq/100 g | compound (Å) | polymer employed | stratified compound | organic cation | polymer |
| Ex. 14 | tetrasilicic mica | 49 | n-lauryl monomethyl diethanol ammonium | 80 | 23 | PPS | 5.00 | 1.14 | 93.86 |
| Ex. 15 | tetrasilicic mica | 49 | n-lauryl monomethyl diethanol ammonium | 80 | 23 | PPO | 5.00 | 1.14 | 93.86 |
| Ex. 16 | tetrasilicic mica | 49 | n-lauryl monomethyl diethanol ammonium | 80 | 23 | PBT | 5.00 | 1.14 | 93.86 |
| Ex. 17 | tetrasilicic mica | 49 | n-lauryl monomethyl diethanol ammonium | 80 | 23 | PC | 5.00 | 1.14 | 93.86 |
| Comp. Ex. 1 | tetrasilicic mica | 49 | n-lauryl triethyl ammonium | 80 | 26 | PA6 | 5.00 | 1.15 | 93.85 |
| Comp. Ex. 2 | tetrasilicic mica | 49 | n-lauryl triethyl ammonium | 40 | 26 | PA6 | 5.00 | 0.58 | 94.42 |
| Comp. Ex. 3 | tetrasilicic mica | 49 | dihexadecyl trimethyl ammonium | 40 | 36.5 | PA66 | 60.00 | 12.38 | 27.62 |
| Comp. Ex. 4 | tetrasilicic mica | 49 | dihexadecyl dimethyl ammonium | 40 | 36.5 | PA66 | 0.50 | 0.10 | 99.40 | ion substitution guantity is (exchanged ion equivalents)/100 g stratified compound

TABLE 3

| | dispersability average thickness of layer (Å) | bending elastic modulus (kg/cm$^2$) | heat deformation temperature (C.°) (18.5 kg/cm$^2$) |
|---|---|---|---|
| Ex. 1 | 30 | 47,000 | 125 |
| Ex. 2 | 40 | 40,500 | 119 |
| Ex. 3 | 20 | 48,000 | 120 |
| Ex. 4 | 10 | 49,000 | 128 |
| Ex. 5 | 10 | 48,300 | 128 |
| Ex. 6 | 48 | 45,000 | 120 |
| Ex. 7 | 50 | 44,500 | 122 |
| Ex. 8 | 60 | 40,000 | 110 |
| Ex. 9 | 10 | 80,000 | 144 |
| Ex. 10 | 20 | 30,000 | 110 |

TABLE 4

| | dispersability average thickness of layer (Å) | bending elastic modulus (kg/cm$^2$) | heat deformation temperature (C.°) (18.5 kg/cm$^2$) |
|---|---|---|---|
| Ex. 11 | 10 | 38,000 | 110 |
| Ex. 12 | 10 | 33,000 | 122 |
| Ex. 13 | 10 | 35,000 | 80 |
| Ex. 14 | 10 | 40,000 | 150 |
| Ex. 15 | 10 | 34,000 | 120 |
| Ex. 16 | 10 | 33,000 | 90 |
| Ex. 17 | 10 | 40,000 | 103 |
| Comp Ex. 1 | 200 | 35,000 | 103 |
| Comp Ex. 2 | 320 | 32,150 | 100 |
| Comp Ex. 3 | 100 | 60,000 | 118 |
| Comp Ex. 4 | 80 | 29,000 | 97 |

INDUSTRIAL APPLICABILITY

The present invention's compound resin composition has a superior bending elastic modulus and thermal resistance, and is suitably employed in a number of fields such as the automotive components, home appliance parts, aircraft parts, and construction materials fields among others.

What is claimed is:

1. A compound resin composition in which an intercalated compound, in which an onium salt of an aminoalcohol derivative is inserted into the layers of a swellable stratified compound and the interlayer distance is in a range of 10 to 25 Å as measured by x-ray diffraction, is finely dispersed in a thermoplastic resin, wherein the proportion of the intercalated compound with respect to the compound resin composition is in the range of 0.5 to 60% by weight, wherein when the onium salt of the aminoalcohol derivative contains an ether bond in the molecular chain, the carbon number of the portion of the chain length having the hydroxyl group is up to 12.

2. A compound resin composition according to claim 1, wherein the amount of organic cation substituted in the intercalated compound is 25~90 meq per 100 g.

3. A compound resin composition according to claim 1 or claim 2, wherein the swellable stratified compound is a clay mineral in which the interlayer charge density is 40~100 Å$^2$/(charge), and which can be swelled by organic cations.

4. A compound resin composition according to claim 3, wherein the swellable stratified compound is at least one selected from the group comprising expandable mica, vermiculite, and smectite.

5. A compound resin composition according to claim 1, wherein a carbon number of the alkyl group having the hydroxyl group of the aminoalcohol derivative is less than 16.

6. A compound resin composition according to claim 1, wherein the onium salt of the aminoalcohol derivative is selected from the group consisting of n-butyl dimethyl monoethanol ammonium, n-hexyl dimethyl monoethanol ammonium, n-octyl dimethyl monoethanol ammonium, n-decyl dimethyl monoethanol ammonium, n-dodecyl dimethyl monoethanol ammonium, n-tridecyl dimethyl monoethanol ammonium, n-hexadecyl dimethyl monoethanol ammonium, n-octadecyl dimethyl monoethanol ammonium, eicosyl dimethyl monoethanol ammonium, n-butyl monomethyl diethanol ammonium, n-hexyl monomethyl diethanol ammonium, n-octyl monomethyl diethanol ammonium, n-decyl monomethyl diethanol ammonium, n-tetra decyl monomethyl diethanol ammonium, n-hexadecyl monomethyl diethanol ammonium, n-octadecyl monomethyl diethanol ammonium, eicosyl monomethyl diethanol ammonium, n-lauryl monomethyl diethanol ammonium, n-butyl triethanol ammonium, n-hexyl triethanol aminoammonium, n-octyl triethanol ammonium, n-decyl triethanol ammonium, n-butyl decyl triethanol ammonium, n-hexadecyl triethanol ammonium, n-octadecyl triethanol ammonium, eicosyl triethanol ammonium, n-lauryl triethanol ammonium, n-butyl monomethyl ethylene ether ethanol ammonium, n-hexyl dimethyl butyl diethylene ethanol monoethanol ammonium, n-tetradecyl dimethyl monoethanol ammonium, and mixtures thereof.

7. A compound resin composition according to claim 1, wherein the thermoplastic resin is selected from the group consisting of polyamide, aromatic polyesters and their copolymers, aliphatic polyesters and their copolymers, AS resins, ABS resins, polyphenylene ether, polyphenylene sulfide, polyacetal, polycarbonate, polybutylene terephthalate and mixtures thereof.

* * * * *